(12) United States Patent
Okano et al.

(10) Patent No.: US 12,264,778 B2
(45) Date of Patent: Apr. 1, 2025

(54) HIGH-PRESSURE HYDROGEN CONTAINER

(71) Applicant: JFE STEEL CORPORATION, Tokyo (JP)

(72) Inventors: Hiroshi Okano, Tokyo (JP); Kazuki Matsubara, Tokyo (JP); Shusaku Takagi, Tokyo (JP); Nobuyuki Ishikawa, Tokyo (JP); Toshio Takano, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/266,301

(22) PCT Filed: Jan. 28, 2022

(86) PCT No.: PCT/JP2022/003190
§ 371 (c)(1),
(2) Date: Jun. 9, 2023

(87) PCT Pub. No.: WO2022/168737
PCT Pub. Date: Aug. 11, 2022

(65) Prior Publication Data
US 2024/0027023 A1    Jan. 25, 2024

(30) Foreign Application Priority Data
Feb. 3, 2021    (JP) .................... 2021-016001

(51) Int. Cl.
*F17C 13/06*    (2006.01)
*F17C 1/00*    (2006.01)

(52) U.S. Cl.
CPC .............. *F17C 1/005* (2013.01); *F17C 13/06* (2013.01); *F17C 2201/0104* (2013.01); *F17C 2203/0643* (2013.01); *F17C 2221/012* (2013.01)

(58) Field of Classification Search
CPC .............. F17C 13/06; F17C 2201/0104; F17C 2203/0643; F17C 2221/012; B65D 43/0229
See application file for complete search history.

(56) References Cited

U.S. PATENT DOCUMENTS

2019/0049069 A1    2/2019    Wada et al.
2020/0340625 A1    10/2020    Wada et al.
(Continued)

FOREIGN PATENT DOCUMENTS

EP    3 415 806 A1    12/2018
EP    3 702 660 A1    9/2020
(Continued)

OTHER PUBLICATIONS

May 14, 2024 Office Action issued in Japanese Patent Application No. 2023-070119.
(Continued)

*Primary Examiner* — Andrew T Kirsch
(74) *Attorney, Agent, or Firm* — Oliff PLC (57) ABSTRACT

A high-pressure hydrogen container includes: a cylinder body; and a lid member that closes an end portion of the cylinder body. The cylinder body includes: a joining portion that fixes the lid member; a cylinder portion that forms an outer shell of a storage portion; and a sealing surface formed at an inner surface of the cylinder body. At least H<K is satisfied, where an area of the sealing surface which the sealing portion abuts is an abutting area, H is a thickness from the abutting area to an outer surface of the cylinder body, part of the cylinder body in which a stress greater than or equal to a predetermined stress σ is generated is a stress generation portion, and L is a distance between the abutting area and the stress generation portion.

11 Claims, 5 Drawing Sheets

(56) References Cited

U.S. PATENT DOCUMENTS

2021/0348724 A1    11/2021   Wada et al.
2024/0027023 A1    1/2024   Okano et al.

FOREIGN PATENT DOCUMENTS

| JP | 2020-56457 A | 4/2020 |
| JP | 2022-119198 A | 8/2022 |
| WO | 2017/138662 A1 | 8/2017 |
| WO | 2019/083047 A1 | 5/2019 |

OTHER PUBLICATIONS

May 27, 2024 Extended Search Report issued in European Patent Application No. 22749611.4.
May 31, 2024 Examination Report issued in Australian Patent Application No. 2022217967.
Apr. 5, 2022 International Search Report issued in International Patent Application No. PCT/JP2022/003190.
Feb. 6, 2022 Office Action issued in Japanese Patent Application No. 2023-070119.
Sep. 30, 2024 Office Action issued in Chilean Patent Application No. 202301954.

HIGH-PRESSURE HYDROGEN CONTAINER

TECHNICAL FIELD

The present disclosure relates to a high-pressure hydrogen container that stores high-pressure hydrogen.

BACKGROUND ART

For example, a high-pressure hydrogen container is used at a hydrogen station to store high-pressure hydrogen, and has a structure in which a lid is screwed to an open end of a cylinder (circular cylindrical body). In such a container for storage of hydrogen, the cylinder filled with hydrogen gas is sealed by a resinous sealing member such as an O-ring provided between an inner circumferential surface of the cylinder and an outer circumferential surface of the lid (see, for example, Patent Literature 1).

However, according to Patent Literature 1, a slight amount of hydrogen passes through the resinous sealing member. Consequently, the hydrogen reaches a female thread portion formed at an open end portion of the cylinder, causing hydrogen-induced damage that starts to occur at a thread bottom at which stress concentration occurs. To solve this problem, the high-pressure hydrogen container disclosed in Patent Literature 1 is configured such that a through hole is provided in a gap portion located between the female thread portion and the resinous sealing member to let out gas in the gap portion and introduce oxygen-containing gas into the gap portion.

CITATION LIST

Patent Literature

Patent Literature 1: Japanese Unexamined Patent Application Publication No. 2020-56457

SUMMARY OF INVENTION

Technical Problem

The high-pressure hydrogen container disclosed in Patent Literature 1 lets out from the through hole, hydrogen that passes through the resinous sealing member and stagnates in the gap portion. This reduces occurrence of cracking in the high-pressure hydrogen container that is caused by the hydrogen that passes through the resinous sealing member and stagnates in the gap portion, though the female thread portion where high stress is generated is located adjacent to the gap portion. However, in the case where high-pressure hydrogen is stored in a metallic container, hydrogen molecules that are present in a predetermined concentration in the container penetrate into a metallic structure that forms the metallic container and diffuse into the metallic structure. That is, in the high-pressure hydrogen container of Patent Literature 1, hydrogen in the cylinder penetrates into the metallic structure that forms the cylinder, diffuses into the metallic structure, and then reaches the female thread portion. On the female thread portion, stress concentration occurs due to its thread engagement with the lid fastened and fixed to the open end portion of the cylinder. Thus, a higher stress is generated at the female thread portion, as compared with other portions of the container. The cylinder of Patent Literature 1 includes an abutting face that is provided at the inner circumferential surface of the cylinder and is perpendicular to the center axis. The lid is brought into contact with the abutting face, an axial force is generated at the lid, and the lid is thus fixed to the female thread portion. Therefore, in the high-pressure hydrogen container, stress concentration occurs not only at the female screw portion, but also at the periphery of the abutting face. The female thread portion and the periphery of the abutting face on which stress acts are affected by the hydrogen that diffuses into the metallic structure, and as a result, damage, such as cracking, starts to occur from those portions.

The present disclosure is applied to solve the above problems, and relates to a high-pressure hydrogen container that reduce occurrence of damage that is caused by diffusion of hydrogen into a metallic structure.

Solution to Problem

A high-pressure hydrogen container according to an embodiment of the present disclosure includes: a cylinder body made of metal and configured to store high-pressure hydrogen; and a lid member that closes an end portion of the cylinder body. The cylinder body includes: a joining portion that fixes the lid member to the end portion of the cylinder body in a direction along a center axis of the cylinder body; a cylinder portion that forms an outer shell of a storage portion configured to store high-pressure hydrogen; and a sealing surface located between the joining portion and the cylinder portion in the direction along the center axis, and formed at an inner surface of the cylinder body. The lid member includes a sealing portion that abuts the sealing surface of the cylinder body, and a fixation portion fixed to the joining portion of the cylinder body. At least H<K is satisfied, where an area of the sealing surface which the sealing portion abuts is an abutting area, the thickness H is a thickness from the abutting area to an outer surface of the cylinder body, part of the cylinder body which includes the joining portion and extends from the joining portion to the abutting area and in which a stress greater than or equal to a predetermined stress σ is generated is a stress generation portion, and the distance L is a distance between the abutting area and the stress generation portion.

Advantageous Effects of Invention

In the high-pressure hydrogen container according to the embodiment of the present disclosure, since the lid member is fixed to the cylinder body, the distance L between the abutting area and the stress generation portion where a predetermined stress is generated satisfies the relationship "H<L", and as a result, metal material of which the cylinder body is made is not affected by hydrogen diffusion. Therefore, in the high-pressure hydrogen container, it is possible to reduce the effect of hydrogen diffusion into the metallic structure of the high-pressure hydrogen container on the strength thereof. Thus, the high-pressure hydrogen container can ensure high reliability even when a high load is applied thereto.

DESCRIPTION OF EMBODIMENTS

A preferred embodiment of a high-pressure hydrogen container of the present disclosure will be described in detail with reference to the drawings. It should be noted that the embodiment as described below is a preferred specific example, and various preferable techniques will thus be described; however, these descriptions are not limiting, unless otherwise specified in the following descriptions.

Embodiment 1

High-Pressure Hydrogen Container 100

Figure 1:
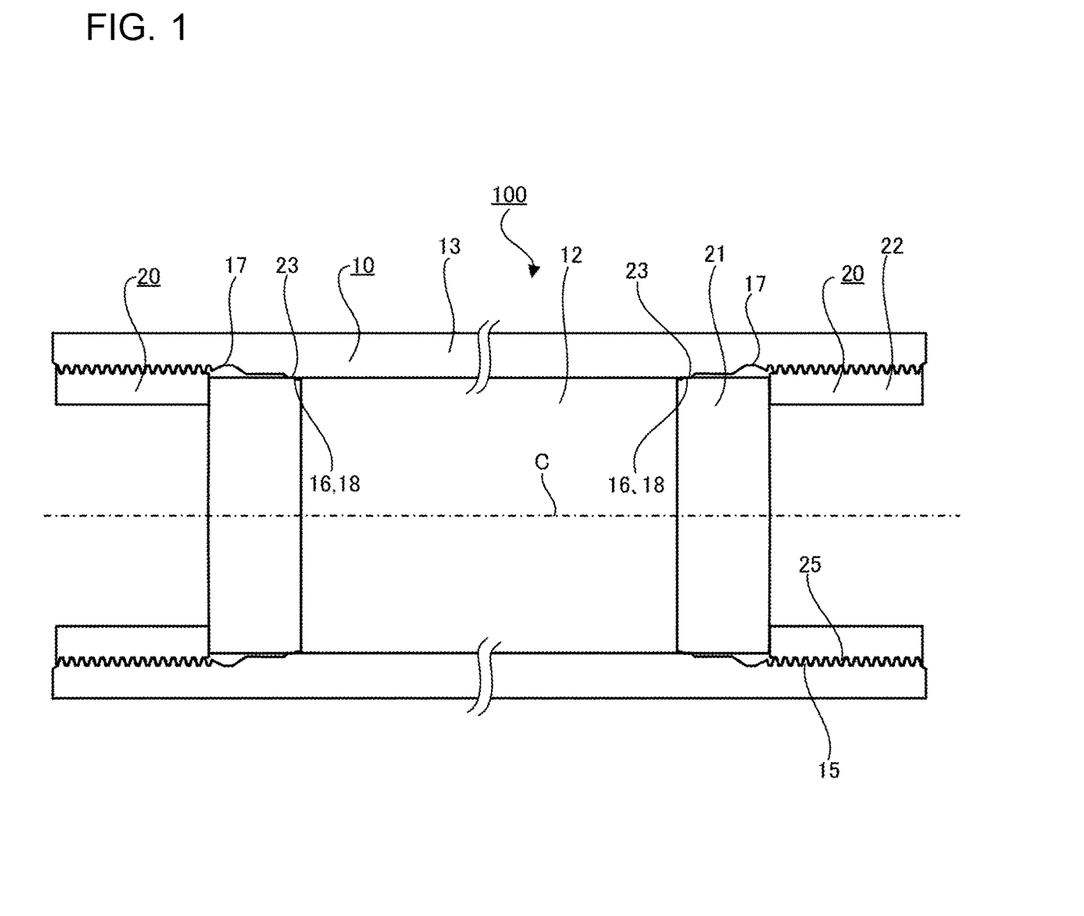
FIG. 1 is a sectional view illustrating a high-pressure hydrogen container 100 according to Embodiment 1.

FIG. 1 is a sectional view illustrating a high-pressure hydrogen container 100 according to Embodiment 1. FIG. 1 schematically illustrates a configuration of the high-pressure hydrogen container 100. For example, the high-pressure hydrogen container 100 is installed at a hydrogen station to supply hydrogen to, for example, a vehicle, and stores high-pressure hydrogen therein. A fuel cell vehicle is equipped with a tank that stores hydrogen at a high pressure of, for example, approximately 75 MPa. In order that the tank of the vehicle be filled with hydrogen, it is necessary that the internal pressure of the installed high-pressure hydrogen container 100 can be kept at a value higher than that of the tank of the vehicle. Each time hydrogen is supplied to the fuel cell vehicle, the internal pressure of the high-pressure hydrogen container 100 decreases, however, this internal pressure is still kept at a high level. That is, the high-pressure hydrogen container 100 is subjected to periodic pressure variations in a high-pressure range. Furthermore, in view of the frequency of supply of hydrogen to the vehicle, the high-pressure hydrogen container 100 needs to be able to maintain its durability over a long period of time, while being subjected to pressure variations at a high-pressure and in cycles of high frequency.

Configuration of High-Pressure Hydrogen Container 100

As illustrated in FIG. 1, the high-pressure hydrogen container 100 according to Embodiment 1 includes a cylinder body 10 made of metal and lid bodies 20 which are fastened and fixed to respective open ends of the cylinder body 10. The cylinder body made of metal has a circular cylindrical shape and has the open ends. Female thread portions 15 are formed at the open ends. The female thread portions 15 are each a thread formed in an inner surface of the cylinder body 10. At a central portion of the cylinder body 10 in its center-axis direction (a direction along a center axis C in FIG. 1), a cylinder portion 13 is provided to form an outer shell of a storage portion 12 that stores hydrogen. The cylinder portion 13 has a circularly cylindrical shape. In Embodiment 1, part of the cylinder portion 13 in which the storage portion 12 is located has a thickness t that is set to, for example, 50 mm. The lid bodies 20 and members that fixes the lid bodies 20 to end portions of the cylinder body 10 may be each referred to as "lid member".

Between the cylinder portion 13 and the female thread portions 15 in the center-axis direction of the cylinder body 10, sealing surfaces 16 are formed. The sealing surfaces 16 are formed at the inner surface of the cylinder body 10, and abut respective sealing portions 23 of the lid bodies 20 to prevent hydrogen in the high-pressure hydrogen container 100 from leaking. It is preferable that part of the sealing surfaces 16 that abut the sealing portions 23 be formed as smooth surfaces to maintain sealing characteristics.

In Embodiment 1, each of the lid bodies 20 includes a first member 21 including the sealing portion 23 and a second member 22 including a male thread portion 25. The first members 21 close respective end portions of the storage portion 12 in the center-axis direction. Each of the first members 21 is formed into substantially a column. In Embodiment 1, the first member 21 is formed to have a smaller outside diameter than the inside diameter of the sealing surface 16 of the cylinder body 10. In an outer circumferential surface of the first member 21, a groove 21a (see FIG. 2) is formed. In the groove 21a, a sealing member 24 is fitted. The sealing member 24 is, for example, an O-ring; however, a sealing member having another configuration may also be employed.

Figure 2:
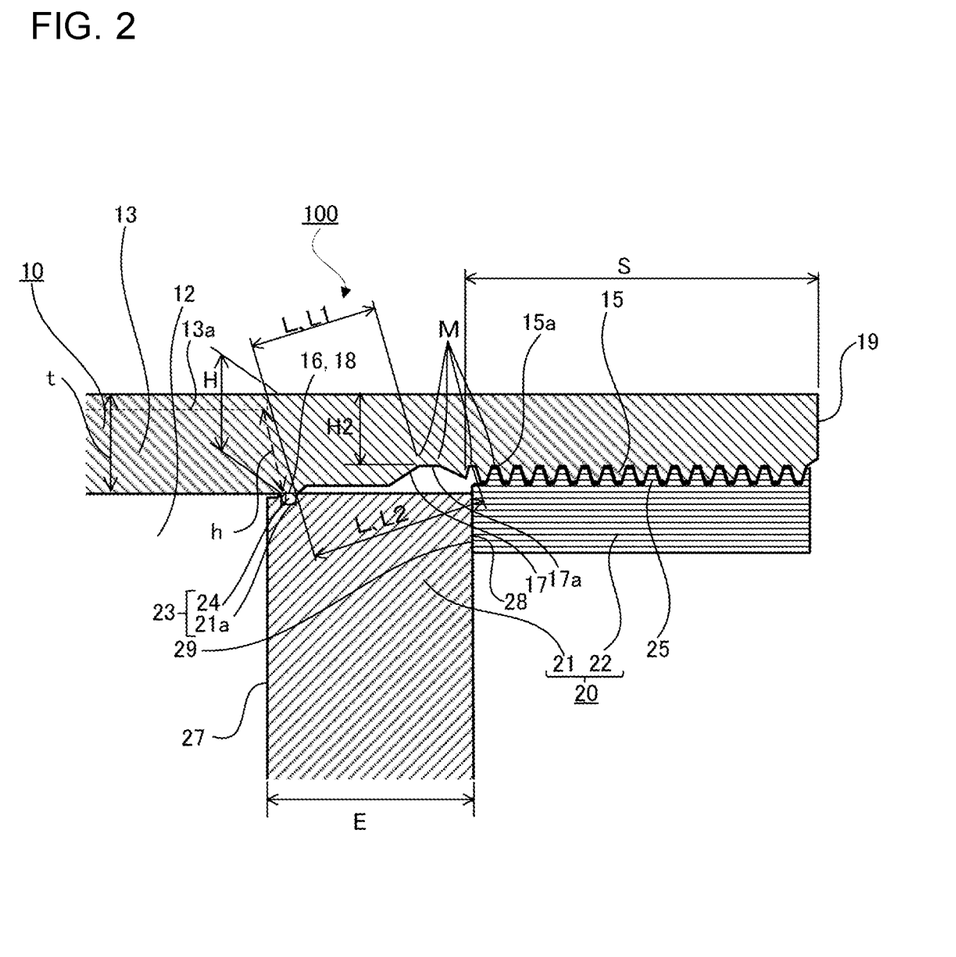
FIG. 2 is an enlarged view of a female thread portion 15 and a sealing surface 16 as illustrated in FIG. 1 and their peripheries.

FIG. 2 is an enlarged view of the female thread portion 15 and the sealing surface 16 as illustrated in FIG. 1 and their peripheries. The female thread portion 15 is formed in an area which is set in advance and extends from an open end 19 of the cylinder body 10. A clearance portion 17 is provided adjacent to the female thread portion 15. The clearance portion 17 is formed in the shape of a step and formed in part of the inner surface of the cylinder body 10 that is located between the female thread portion 15 and the sealing surface 16; that is, the clearance portion 17 is formed to have a larger inside diameter than that of the female thread portion 15. The clearance portion 17 serves as a clearance for a machining tool at the time of processing the female thread portion 15. In Embodiment 1, the clearance portion 17 has inclined surfaces at both ends, and the inclined surfaces are connected to the female thread portion 15 and the sealing surface 16, respectively. The inside diameter of the cylinder body 10 gradually changes, thereby to reduce stress that is generated due to both the pressure in the storage portion 12 and fastening of the female thread portion 15.

The sealing surface 16 is formed adjacent to the clearance portion 17 in the center-axis direction. In Embodiment 1, the sealing surface 16 is formed to have a smaller inside diameter than that of the clearance portion 17 and the same inside diameter as that of the cylinder portion 13. However, the inside diameter of the sealing surface 16 can be appropriately set in conformity with the sealing portion 23 of the lid body 20. The sealing member 24 abuts the sealing surface 16, thereby sealing the storage portion 12 to prevent leakage of hydrogen from the storage portion 12. It should be noted that the thickness of part of the cylinder body 10 where the sealing surface 16 is a thickness H. The thickness H may be set different from the thickness t of the cylinder body 10 in the storage portion 12. That is, a step may be formed between the sealing surface 16 of the cylinder body 10 and the inner surface of the storage portion 12. Regarding Embodiment 1, a configuration in which H=t is illustrated by way of example.

Cylinder Body 10

The cylinder body 10 is made of, for example, low-alloy steel. That is, the cylinder body 10 is made of steel material such as chromium-molybdenum steel, nickel-chromium-molybdenum steel, manganese-chromium steel, manganese steel, or boron-added steel. The cylinder body 10 is formed in the shape of a circular cylinder having opening ends on both sides. At the inner circumferential surface at each of the both end portions, the female thread portion 15, the clearance portion 17 for a threading tool, and the sealing surface 16 are formed. The central portion of the cylinder body 10 is the cylinder portion 13 whose interior serves as the storage portion 12. It should be noted that in Embodiment 1, the cylinder body 10 is formed in the shape of a circular cylinder having opening ends on both sides, however, the cylinder body 10 may is formed in the shape of a cylinder having an open end on one side and a bottom. The shape of the cylinder body 10 is not limited to the circularly cylindrical shape; that is, the cylinder body 10 can have another shape such as an elliptic cylindrical shape.

A decarburized layer is removed from the inner circumferential surface of the cylinder body 10 by processing. After the removal of the decarburized layer, shot balls having a large mass are applied to the inner circumferential surface of the cylinder body 10, and residual compressive stress is thus applied to the inner circumferential surface. Residual compressive stress may also be applied to the cylinder portion 13, the sealing surface 16, the clearance portion 17, and the female thread portion 15.

Hydrogen gas that leaks from the sealing portion 23 may stay in the clearance portion 17 and the female thread portion 15. The strength of stress generation portions M of the clearance portion 17 and the female thread portion 15 may be reduced by leaking hydrogen gas. In view of this point, in order to let out the staying hydrogen gas, an exhaust outlet (not illustrated) may be provided such that the exhaust outlet causes a space formed by the clearance portion 17 to communicate with the outside. Alternatively, a plurality of holes may be provided such that the holes cause the clearance portion 17 to communicate with the outside and thus gas in the clearance portion 17 to circulate with outside air.

Lid Body 20

The lid body 20 is joined to an associated one of the end portions of the cylinder body 10. The lid body 20 is provided along the center-axis direction of the storage portion 12, and closes the end portion of the cylinder body 10. The lid body 20 includes the first member 21 which faces the storage portion 12 and the second member 22 which is fixed to the female thread portion 15 of the cylinder body 10. The first member 21 is called "plug" and closes the storage portion 12. The second member 22 is called "gland nut" and fixes the plug in the axial direction.

First Member 21

The first member 21 contacts high-pressure hydrogen gas when the storage portion 12 is filled with the hydrogen gas, and is thus made of material having a high strength for low-temperature hydrogen gas. That is, the first member 21 is formed of material that can ensure a sufficient strength even under low temperature, and is, for example, formed of austenitic stainless steel. The first member 21 is formed into substantially a columnar shape such that at least the outer diameter of the first member 21 is smaller than the inside diameter of the sealing surface 16. An end face of the first member 21 forms a surface of the storage portion 12 in the axial direction.

The first member 21 includes the sealing portion 23 at its outer circumferential surface. In Embodiment 1, the sealing portion 23 includes the groove 21a and the sealing member 24. As an example of the sealing member 24, the O-ring is provided in the groove 21a. The outer circumferential surface of the sealing member 24 abuts the sealing surface 16 of the cylinder body 10. An area of the sealing surface 16 of the cylinder body 10 which the sealing member 24 abuts will be referred to as an abutting area 18. The sealing member 24 has an outside diameter that is set larger than the inside diameter of the sealing surface 16. Thus, the first member 21 is inserted and press-fitted into the cylinder body 10 by the sealing member 24. The O-ring serving as the sealing member 24 is pressed by the sealing surface 16 and is filled in the groove 21a to close a gap between a bottom surface of the groove 21a and the sealing surface 16. A structure made up of the sealing portion 23 and the sealing surface 16 seals the storage portion 12 to prevent leakage of high-pressure hydrogen from the storage portion 12.

Second Member 22

The second member 22 includes the male thread portion 25 that is engaged with the female thread portion 15 of the cylinder body 10, and an end face 29 that abuts an end face 28 of the first member 21. The second member 22 blocks a force that is applied to the first member 21 in the axial direction from high-pressure hydrogen gas in the storage portion 12, and fixes the lid body 20 to the end portion of the cylinder body 10. The male thread portion 25 included in the second member 22 is engaged with the female thread portion 15 of the cylinder body 10, whereby that the position of the lid body 20 in the axial direction is fixed. In Embodiment 1, the cylinder body 10 and the lid body 20 do not have surfaces that abut each other in the axial direction. Therefore, to an engagement portion between the female thread portion 15 of the cylinder body 10 and the male thread portion 25 of the second member 22, a friction force between the sealing portion 23 of the first member 21 and the sealing surface 16 of the cylinder body and a force due to the high-pressure hydrogen gas in the storage portion 12 are applied as an axial force. This axial force causes a fastening force to be generated between the female thread portion 15 and the male thread portion 25, whereby the lid body 20 is fixed to the end portion of the cylinder body 10. It should be noted that the first member 21 and the cylinder body 10 may be formed to abut each other in the axial direction. Alternatively, the second member 22 and the cylinder body 10 may be formed to abut each other in the axial direction. In this case, a fastening force between the female thread portion 15 and the male thread portion 25 is generated by an axial force that is generated when the first member 21 or the second member 22 and the cylinder body 10 abut each other in the axial direction.

In Embodiment 1, the first member 21 is formed into a columnar shape or a disk-like shape; however, a pipe may be joined to the central portion of the first member 21. The pipe is installed to supply liquid hydrogen or hydrogen gas to the storage portion 12 from the outside. The pipe is also alternatively provided to let out hydrogen gas stored in the storage portion 12 to the outside. The high-pressure hydrogen container 100 stores hydrogen gas in a high-pressure state to fill the hydrogen gas in, for example, a hydrogen tank provided in the vehicle. Because of installation of the pipe, the first member 21 of the lid body 20 may be subjected to low temperature during supply of the liquid hydrogen or hydrogen gas. It is therefore preferable that the first member 21 be made of material, such as austenitic stainless steel, which can ensure a sufficient strength even under low temperature. The second member 22 of the lid body 20 does not contact hydrogen gas. Nor is the second member 22 directly subjected to low temperature. Thus, in the second member 22, it suffices that the male thread portion which serves as a fixation portion, can ensure an adequate strength.

Low-alloy steel similar to that of the cylinder body 10 may be employed as material of the second member 22.

In Embodiment 1, the first member 21 and the second member 22 are separate members, can thus be formed of different materials, and can reduce costs while ensuring adequate durability. In Embodiment 1, only the first member 21 is formed of austenitic stainless steel, and the second member 22 is formed of material other than austenitic stainless steel. It is therefore possible to reduce the costs, and in addition ensure both an adequate fixing strength for the lid body 20 and adequate durability of the lid body 20. It should be noted that the first member 21 and the second member 22 may be formed as a single body. In this case, it is possible to reduce the number of components that form the high-pressure hydrogen container 100.

Positional Relationship Between Sealing Portion 23 and Stress Generation Portion M in Periphery of Joining Portion In Embodiment 1, in the cylinder body 10, the second member 22 is engaged with the female thread portion 15, and a pressure is applied to the cylinder body 10 by high-pressure hydrogen from the storage portion 12. As a result, a predetermined stress σ is generated at each of portions. The cylinder body 10 has, as portions on which stress concentration easily occurs, the clearance portion 17 and a valley 15a of the female thread portion 15. In the high-pressure hydrogen container 100 as illustrated in FIGS. 1 and 2, the sealing portion 23 and the sealing surface 16 abut each other in the abutting area 18, and stress concentration occurs at the clearance portion 17 and the valley 15a of the female thread portion 15. In this configuration, the shorter one of the distance from the abutting area 18 to the clearance portion 17 and the distance from the abutting area 18 to the valley 15a is a distance L, and the distance from the abutting area 18 to the outer surface of the cylinder body 10 is a thickness H. In the high-pressure hydrogen container 100 according to Embodiment 1, the relationship between the distance L and the thickness H satisfies H<L. Since such a relationship is satisfied, it is possible to reduce occurrence of a damage such as cracking at the clearance portion 17 and the female thread portion 15 that is caused by hydrogen embrittlement occurring because of the effect of hydrogen in the storage portion 12 on the clearance portion 17 and the female thread portion 15.

Example of Hydrogen Diffusion into Metal Forming High-Pressure Hydrogen Container 100

Figure 3:
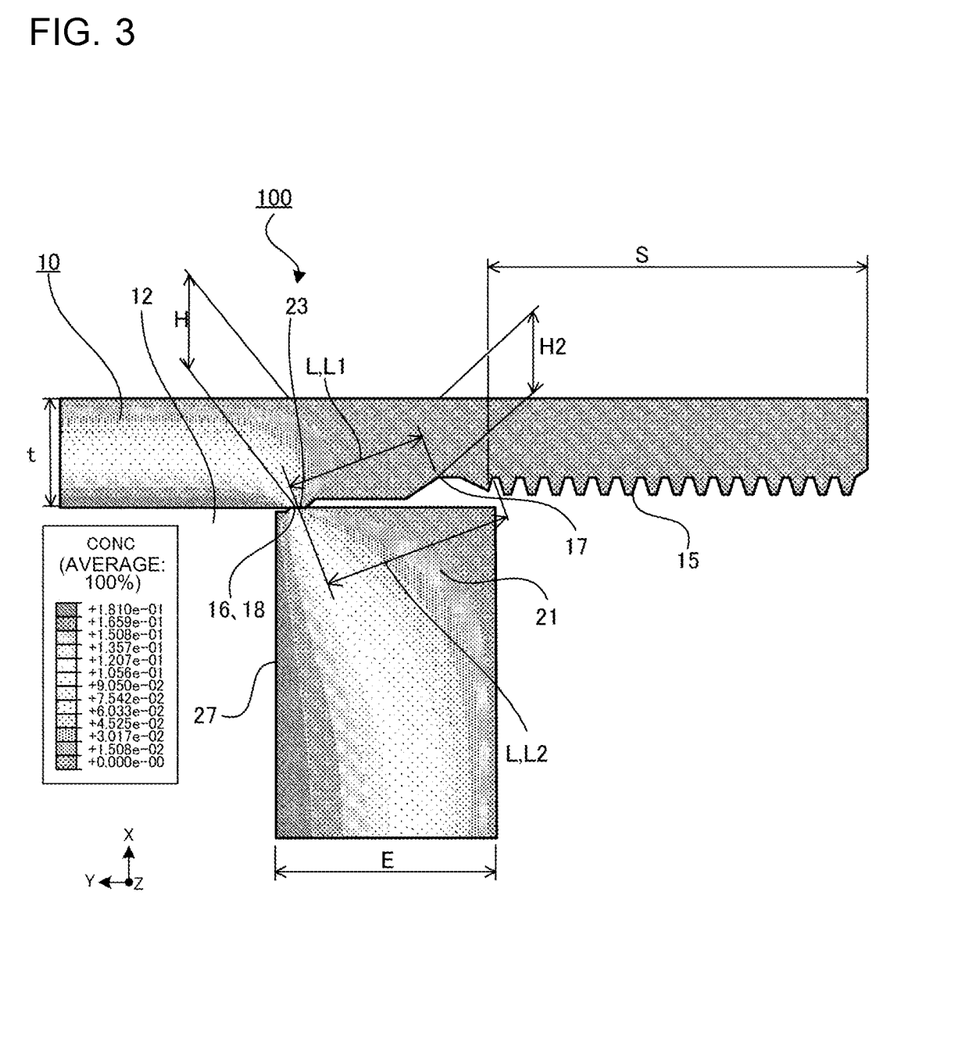
FIG. 3 illustrates a diffusion state of hydrogen into a metallic structure in a sealing portion 23 of the high-pressure hydrogen container 100 according to Embodiment 1 and the periphery of the sealing portion 23.

FIG. 3 illustrates a diffusion state of hydrogen into a metallic structure in the periphery of the sealing portion 23 in the high-pressure hydrogen container 100 according to Embodiment 1. FIG. 3 is a view based on analysis of diffusion of hydrogen gas in the storage portion 12 that diffuses into the metallic structure of the high-pressure hydrogen container under predetermined conditions. In the high-pressure hydrogen container 100 according to Embodiment 1, since the cylinder body 10 is formed of low-alloy steel, hydrogen penetrates and diffuses into the metallic structure from the surface of the cylinder body 10 that is in contact with hydrogen gas filled in the storage portion 12. In the high-pressure hydrogen container 100 according to Embodiment 1, hydrogen diffuses from the abutting area 18 where the sealing portion 23 and the sealing surface 16 abut each other to the periphery of the sealing surface 16. In the cylinder portion 13, hydrogen diffuses from the inner surface to the outer surface of the cylinder portion 13. However, hydrogen does not greatly diffuse in the axial direction of the cylinder body 10, as compared with the diffusion of hydrogen in the radial direction. Therefore, the hydrogen that has diffused into the metallic structure does not reach the clearance portion 17 or the female thread portion 15 of the cylinder body 10. The hydrogen that has penetrated into the metallic structure diffuses into the metallic structure under predetermined conditions; however, the hydrogen easily diffuses in the radial direction of the cylinder body 10, which has a relatively small thickness, and thus does not diffuse into the clearance portion 17 or the female thread portion 15 which are located apart from the abutting area 18 in the axial direction. It should be noted that in the lid body 20, hydrogen diffuses into a region of the first member 21 in the vicinity of the center axis C in such a manner to pass through the first member 21 in its thickness direction.

FIG. 3 illustrates a diffusion state of hydrogen that diffuses into the metallic structure of each of the portions of the high-pressure hydrogen container 100, especially in the case where chromium-molybdenum steel (SCM435) is used and the storage portion 12 is filled with hydrogen gas of 95 MPa. Also, FIG. 3 illustrates the hydrogen that diffuses into the metallic structure of each of the portions of the high-pressure hydrogen container 100 and enters a steady state. The hydrogen in the storage portion 12 of the high-pressure hydrogen container 100 penetrates into the metallic structure with the passage of time, and then passes through the cylinder body 10. FIG. 3 illustrates the state in which the hydrogen passes through the cylinder portion 13 of the cylinder body 10, and flows out to an environment under atmospheric pressure, where the high-pressure hydrogen container 100 is installed. In this state, with respect to the content of hydrogen that diffuses into the metallic structure of the cylinder body the hydrogen diffuses in a thickness direction thereof, but the content of the hydrogen that diffuses in the axial direction is low. Referring to FIG. 3, the initial hydrogen concentration in the storage portion 12 is 0.181 [weight ppm] and the hydrogen diffusion coefficient D is $2.3 \times 10^{-10}$ [m$^2$/s].

FIG. 3 that illustrates the diffusion state of hydrogen in the high-pressure hydrogen container 100 is based on the diffusion flow rate J of hydrogen that diffuses into the metallic structure described below.

[Math. 1]

$$J = -sD\left(\frac{\partial \varphi}{\partial X} + \kappa_p \frac{\partial p}{\partial X}\right) \quad \text{(Equation 1)}$$

J is the diffusion flow rate [ppm·mm/s];
D is the diffusion coefficient [mm$^2$/s];
φ is normalized concentration φ=c/s;
c is hydrogen concentration [ppm];
s is solubility [ppm·mm/N$^{1/2}$];
p is hydrostatic stress $(\sigma_X+\sigma_Y+\sigma_Z)/3$ [MPa]; and
$\kappa_p$ is hydrostatic stress (coefficient) effectiveness factor that depends on concentration.

Figure 4:
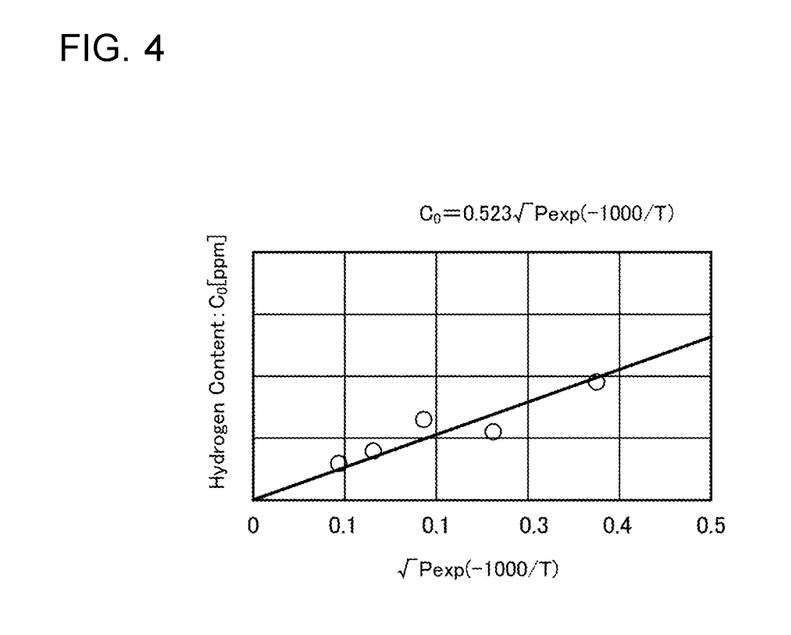
FIG. 4 illustrates a correlation between a pressure of hydrogen gas and an initial concentration of hydrogen that penetrates into the metallic structure.

FIG. 4 illustrates a correlation between the pressure of hydrogen gas and the initial content of hydrogen that penetrates into the metallic structure. FIG. 4 is a diagram obtained by a high-pressure hydrogen permeation test and illustrates the relationship between the pressure P of hydrogen and the content $C_0$ of hydrogen that penetrates into chromium-molybdenum steel (SCM435). According to FIG. 4, the content $C_0$ of hydrogen that penetrates into the material of chromium-molybdenum steel increases as the pressure P increases. As indicated in FIG. 4, the relationship "$C_0=0.523P^{(1/2)} \exp(-1000/T)$" is satisfied, where T is temperature. In the high-pressure hydrogen container 100 as illustrated in FIG. 3, the pressure in the storage portion 12 is set to 95 MPa. Thus, it can be seen from FIG. 3 that the initial content $C_0$ of the hydrogen is 0.181 weight ppm.

Figure 5:
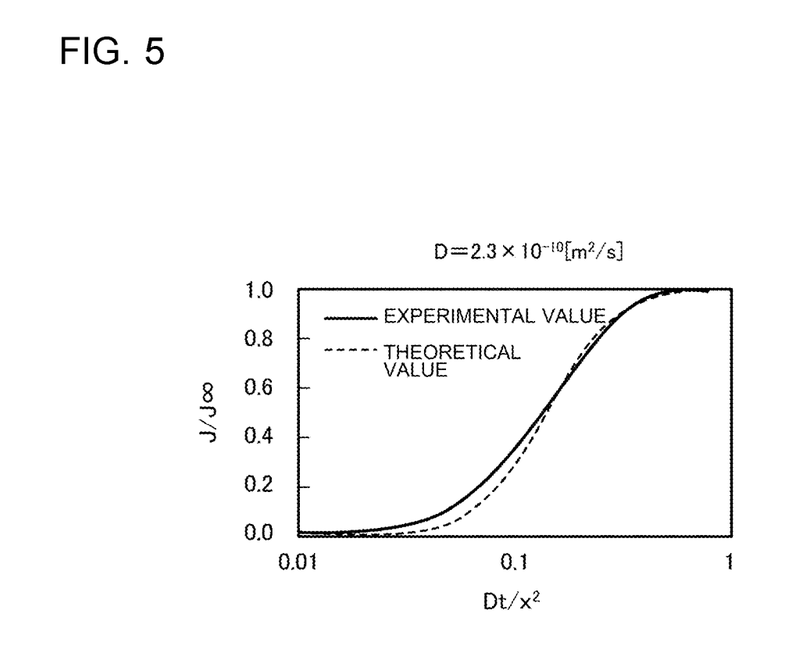
FIG. 5 illustrates a correlation between a hydrogen diffusion coefficient D and a diffusion flow rate J.

FIG. 5 illustrates a correlation between the hydrogen diffusion coefficient D and the diffusion flow rate J. FIG. 5 is a diagram obtained by the same high-pressure hydrogen permeation test as in FIG. 4. Hydrogen gas was introduced into a container formed of chromium-molybdenum steel (SCM435). The hydrogen diffusion coefficient D was obtained based on the behavior of the hydrogen from time at which the hydrogen was introduced into the container formed of chromium-molybdenum steel (SCM435) to time at which the hydrogen enters a steady state after passing through the container, and entered a steady state. The hydrogen concentration at a surface of the high-pressure hydrogen container 100 that contacts the outside air was set to 0 [weight ppm]. It should be noted that in FIG. 5, t is time [s], and x is a distance [m] from the surface on which metal and hydrogen gas are in contact with each other. FIG. 3 illustrates a hydrogen diffusion state in the high-pressure hydrogen container 100 as the hydrogen diffusion coefficient $D=2.3\times10^{-10}$ [m²/s] based on FIG. 5.

It should be noted that the diffusion state of hydrogen into the high-pressure hydrogen container 100 as illustrated in FIG. 3 was obtained, where the solubility s was set to 0.076033 [ppm·mm/$N^{1/2}$], using the value of solubility of material having a strength and a structure which are similar to those of chromium-molybdenum steel (SCM435) (reference: Fujii T., Hazama T., Nakajima H., and Horita R.: Current Solutions to Hydrogen Problems in Steels, (1982), 361, ASM International Materials, Park, Ohio). The value of the hydrostatic stress effectiveness factor $\kappa_p$ was obtained by linearly interpolating the coefficients for the following concentrations:

ppm: 0.00000 [$N^{1/2}$/mm];
1.00 ppm: 0.10803 [$N^{1/2}$/mm]; and
3.00 ppm: 0.54014 [$N^{1/2}$/mm].

Stress Generated in High-Pressure Hydrogen Container 100

Figure 6:
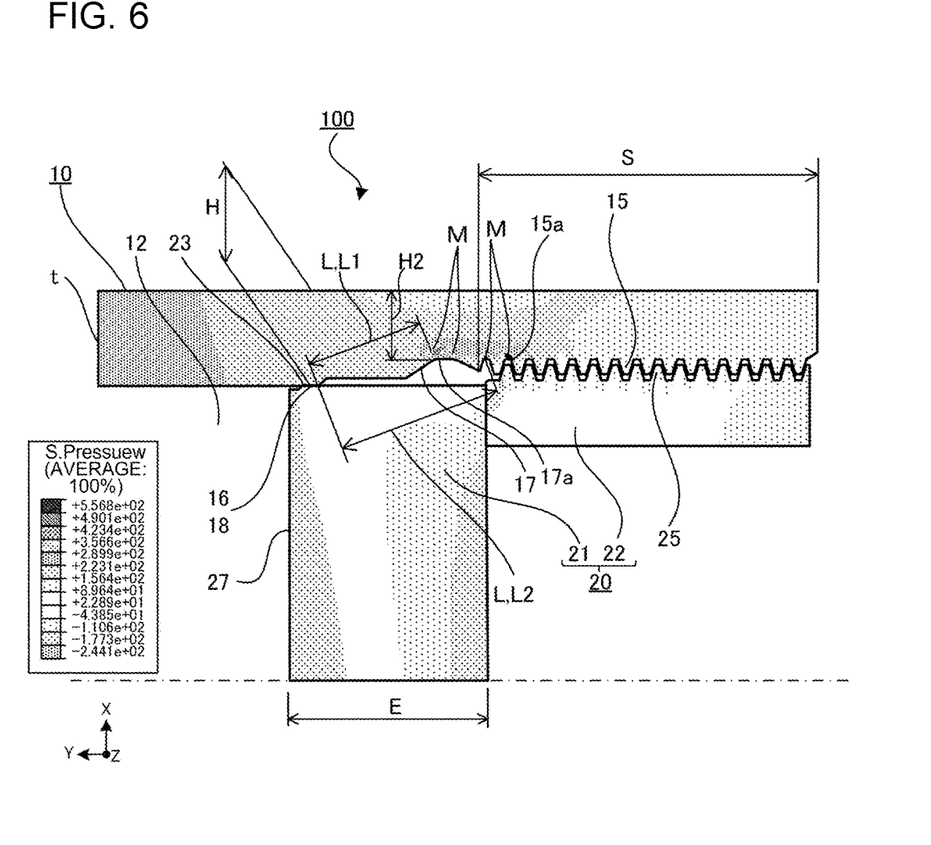
FIG. 6 illustrates an example of a stress generation state in the periphery of the female thread portion 15 in the high-pressure hydrogen container 100 according to Embodiment 1.

FIG. 6 illustrates an example of a state in which stress is generated in the periphery of the female thread portion 15 in the high-pressure hydrogen container 100 according to Embodiment 1. FIG. 6 illustrates a hydrostatic stress distribution in the periphery of a portion where the cylinder body 10 and the lid body 20 are joined together, with hydrogen gas of 95 MPa filled in the storage portion 12 of the high-pressure hydrogen container 100. Referring to FIG. 6, a certain level of stress is generated in the entirety of the cylinder body 10 and the lid body 20, by the pressure of high-pressure hydrogen in the storage portion 12. This stress is sufficiently low, as compared with the tensile strength of the material that form the cylinder body 10 and the lid body 20. However, in the cylinder body 10, a high stress σ is generated at the bottom portion 17a of the clearance portion 17 and at the valley 15a of the female thread portion 15 which is located closer to the storage portion 12. The stress σ is a hydrostatic stress that is the average of stresses in X-, Y-, and Z-directions, and is calculated as $\sigma=(\sigma_X+\sigma_Y+\sigma_Z)/3$. The higher the hydrostatic stress, the more easily the metallic structure is affected by hydrogen.

In Embodiment 1, the stress generation portions M of the high-pressure hydrogen container 100 are present at the female thread portion 15, the periphery of the sealing surface 16, and the clearance portion 17, and are portions and points where a stress higher than or equal to a predetermined stress σ is generated. The predetermined stress σ is, for example, one-third of the tensile strength of metal material. In Embodiment 1, the bottom portion 17a of the clearance portion 17 and the valley 15a of the female thread portion 15 which is located closer to the storage portion 12 as illustrated in FIG. 6 correspond to the stress generation portions M. As illustrated in FIG. 6, in the high-pressure hydrogen container 100 according to Embodiment 1, the bottom portion 17a of the clearance portion 17 that is the closest from the abutting area 18 is the stress generation portion M, and the distance L from the abutting area 18 to the stress generation portion M is set greater than the thickness H from the abutting area 18 to the outer surface of the cylinder body 10. In an existing high-pressure hydrogen container, diffusion of hydrogen into a metallic structure is not considered, and the relationship between the distance L and the thickness H is set such that the existing high-pressure hydrogen container withstands the pressure in the storage portion 12. That is, if the existing high-pressure hydrogen container can withstand the pressure in the storage portion, the distance L is set to the shortest possible distance. By contrast, in Embodiment 1, as illustrated in FIG. 3, the high-pressure hydrogen container is formed such that hydrogen passes through the cylinder body 10 and flows out of the cylinder body 10 to the outside before diffusing into the metallic structure and reaching the stress generation portion M. Therefore, the stress generation portion M is not affected by the hydrogen.

As described above, the relationship between the distance L and the thickness H is expressed by H<L. Specifically, H=K·L, where k is the coefficient, and the coefficient K is smaller than 1. The coefficient K varies depending on the material of the cylinder body 10, the distribution of stress that is generated in the cylinder body 10, and the hydrogen concentration in the storage portion 12. In the high-pressure hydrogen container 100 in Embodiment 1, K<1. It should be noted that in the high-pressure hydrogen container 100 according to Embodiment 1, the pressure in the storage portion 12 is set lower than or equal to 100 MPa that is the pressure in the storage portion 12 when the high-pressure hydrogen container 100 is used, and a portion whose tensile strength is equal to or higher than 310 MPa that is one-third of the tensile strength of chromium-molybdenum steel of which the cylinder body 10 is formed, that is, 930 MPa, is the stress generation portion M. In the high-pressure hydrogen container 100 as illustrated in FIG. 6, a stress of approximately 350 MPa is generated in the stress generation portion M at the bottom portion 17a of the clearance portion 17, and a stress of approximately 490 MPa is generated in the stress generation portion M at the valley of the female thread portion 15.

Figure 7:
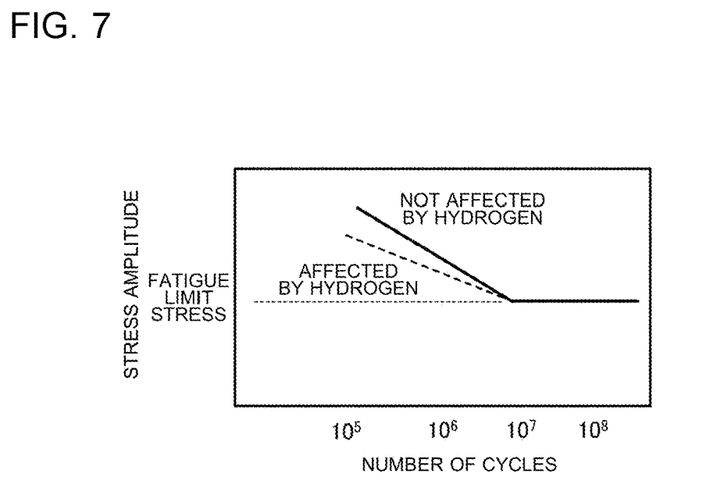
FIG. 7 illustrates a relationship between a stress that acts on metal material and the number of cycles in which stress acts.

FIG. 7 illustrates a relationship between a stress that acts on the metal material and the number of cycles in which the stress acts. When a repeated stress is applied to the metal material, the metal material is broken. However, when the repeated stress is reduced, the metal material is not broken even when the repeated stress is applied to the metal material in $10^6$ to $10^7$ cycles or more. The stress at this time will be referred to as "fatigue limit". In the case where the metal material is under the effect of hydrogen, even in a low-cycle range in which a repeated stress is applied with a low frequency, the stress that can break the metal material is lower than in the case where the metal material is not affected by hydrogen. However, if the repeated stress is less than or equal to the fatigue limit, the effect of hydrogen is negligible. Therefore, a portion where a stress equal to or higher than the fatigue limit stress of the metal material is generated is determined as the stress generation portion M, whereby the distance L can be set shorter. By setting the distance L to the shortest possible distance, it is possible to reduce the size of a portion other than the storage portion 12, while ensuring a sufficient strength, even in an environment where the metal material is affected by hydrogen.

The high-pressure hydrogen container 100 is filled with hydrogen at a high pressure of 75 MPa to 100 MPa, and supplies the hydrogen to, for example, the hydrogen tank of the vehicle. The pressure thus varies with a high frequency. For example, since the hydrogen tank of the vehicle stores hydrogen at 75 MPa, the storage portion 12 of the high-pressure hydrogen container 100 needs to be kept at at least a higher pressure than 75 MPa. Therefore, after the high-pressure hydrogen container 100 supplies hydrogen to, for example, the hydrogen tank, and then the pressure in the storage portion 12 decreases, the storage portion 12 is supplied with liquid hydrogen or hydrogen gas, and the pressure therein is increased to a high pressure again. Thus, the cylinder body 10 of the high-pressure hydrogen container 100 is subjected to frequent pressure variations in a high-pressure range of, for example, 75 MPa to 100 MPa. Because of the pressure variations, the cylinder body 10 is in a state in which stress is constantly generated. Particularly, in the joining portion between the cylinder body 10 and the lid body 20, at which stress concentration is likely to occur, a high stress is generated, and is repeatedly subjected to a stress amplitude. The high-pressure hydrogen container 100 needs to have such a high strength as to prevent the high-pressure hydrogen container 100 from being broken, even when being repeatedly subjected to such a high stress amplitude as described above.

The high-pressure hydrogen container 100 according to Embodiment 1 needs to have a high strength as described above, and is thus formed of low-alloy steel having a high tensile strength and a high fatigue strength. The low-alloy steel has a high tensile strength, high toughness, and thus a high fatigue strength. However, when hydrogen penetrates into a metallic structure of the low-alloy steel, the toughness thereof is reduced, and as a result, the low-alloy steel may be broken. In the existing high-pressure hydrogen container, only the effect of hydrogen on a surface that is contact with the hydrogen is considered. However, the high-pressure hydrogen container 100 according to Embodiment 1 reduces lowering of the strength of a member which contacts hydrogen which diffuses into the metallic structure of the member, due to the effect of the hydrogen. The distance L from the stress generation portion M to the abutting area 18 between the sealing portion 23 and the sealing surface 16 is set adequately, whereby the high-pressure hydrogen container 100 can ensure the maximum size of the storage portion 12, and can increase the volumetric efficiency, while reducing lowering of its strength.

The female thread portion 15 of the cylinder body 10 may be referred to as "joining portion". Also, the male thread portion 25 of the lid body 20 may be referred to as "fixation portion". It should be noted that the female thread portion 15 and the male thread portion 25 in Embodiment 1 may have another joining structure. The cylinder body 10 and the lid body 20 may be joined together by other joining methods such as fitting, welding, or fixation using a bolt. In the case where the method of joining the cylinder body 10 and the lid body 20 together is changed, the position of the stress generation portion M relative to the high-pressure hydrogen container 100 according to Embodiment 1 is changed. Even in that case, the high-pressure hydrogen container 100 can still ensure an adequate strength by satisfying the condition that the distance L is greater than the thickness H. To be more specific, as illustrated in FIG. 6, the internal pressure of the high-pressure hydrogen container 100 is set to satisfy a predetermined condition, a stress that is generated in the cylinder body 10 is grasped, and the stress generation portion M is specified. In that case, since the distance L between the stress generation portion M and the abutting area 18, which the sealing portion 23 abuts, is greater than the thickness H, the high-pressure hydrogen container 100 can ensure an adequate strength without being affected by stored hydrogen.

It should be noted that in Embodiment 1, the stress generation portion M is set as a portion where a stress greater than or equal to "one-third of the tensile stress of metal material" is generated. However, the stress generation portion M may be set as a portion where "a fatigue limit stress of metal material" is generated.

The high-pressure hydrogen container 100 as illustrated in FIG. 6 is the same as that as illustrated in FIG. 3, and has, for example, the following dimensions.

The thickness H from the abutting area 18 to the outer circumference of the cylinder body 10 is 50 mm;
  the thickness H2 of the bottom portion 17a of the clearance portion 17 is 36 mm;
  the length S of the female thread portion 15 in the axial direction is 217 mm;
  the thickness E of the first member 21 is 110 mm;
  the outer diameter of the cylinder body 10 is φ406 mm; and
  the thickness of the second member 22 is 42 mm.

In the stress distribution in the high-pressure hydrogen container 100 as illustrated in FIG. 6, the pressure in the storage portion 12 is 95 MPa, and FIG. 6 illustrates the state of the cylinder body 10 and the lid body 20 at the female thread portion 15 and the male thread portion. In the high-pressure hydrogen container 100 as described above, the distance L from the abutting area 18 to the stress generation portion M is 65.5 mm. This distance L is the distance from the abutting area 18 to the stress generation portion M which is the closest from the abutting area 18 in the case where the stress generation portion M is a portion where a stress greater than or equal to 310 MPa which is "one-third of the tensile stress of metal material" is generated. This distance L corresponds to the distance L1 indicated in FIG. 6. It should be noted that in the case where the stress generation portion M is a portion where a stress of 465 MPa or higher, that is "a fatigue limit stress of metal material" is generated, the distance L is the distance L2 indicated in FIG. 6, that is, 86 mm. In the high-pressure hydrogen container 100 that satisfies H<L as illustrated in FIG. 6, the high-pressure hydrogen container 100 can neglect the effect of hydrogen stored in the cylinder body 10 on the stress generation portion M, and can be still prevented from being broken, even when being subjected to a stress amplitude due to the high-pressure hydrogen in the cylinder body 10.

Note that although the thickness H as indicated in FIG. 6 is equal to the thickness t of the cylinder body 10 in Embodiment 1, it is assumed that, for example, in the case where a step 13a (which has such a shape as illustrated by the dotted line in FIG. 2) is formed at the outer circumferential surface of the cylinder body 10 in FIG. 6, the shortest distance h from the abutting area 18 to the step 13a corresponds to the thickness H.

As described above, in the high-pressure hydrogen container 100, the state of stress which is generated with the pressure in the storage portion 12 applied is determined and the position of the stress generation portion M is specified. As described above, the stress generation portion M is a portion where the stress σ is greater than or equal to one-third of the tensile stress of metal material, or is greater than or equal to the fatigue limit stress of metal material. Although it depends on the shape of the high-pressure hydrogen container 100, a plurality of locations may be each applicable as the position of the stress generation portion M. In that case, one of the locations that is the shortest from the abutting area 18 which the sealing member 24 abuts is the position of the stress generation portion M. At this time, the high-pressure hydrogen container 100 has such a configuration as to satisfy H<L as the relationship between the thickness H and the distance L from the abutting area 18 to the stress generation portion M. The high-pressure hydrogen container 100 is designed such that the distance L is set to the shortest possible distance, while being greater than the thickness H. As a result, the stress generation portion M is not affected by hydrogen and its strength is not reduced. It should be noted that in the case where stress generation portions M are present at a plurality of locations, the shortest one of the distances between the abutting area 18 and the stress generation portions M is defined as the distance L, and the high-pressure hydrogen container 100 is configured in such a manner as to satisfy H<L.

The high-pressure hydrogen container 100 according to Embodiment 1 does not have a configuration in which the first member 21 or the second member 22 abuts the cylinder body 10 in the axial direction. Thus, as illustrated in FIG. 6, the stress generation portion M is located at the position of the clearance portion 17 or the valley of the female thread portion 15. By virtue of this configuration, the high-pressure hydrogen container 100 satisfies H<L, the stress generation portion M is not affected by hydrogen, and the high-pressure hydrogen container 100 can ensure an adequate strength, with high-pressure hydrogen stored. It should be noted that in the case where, for example, a high-pressure hydrogen container is configured such that the first member 21 and the cylinder body 10 abut each other in the axial direction, the stress generation portion M is located in the periphery of the abutting portion in the axial direction. Therefore, it is preferable that the distance between the abutting area 18 and the abutting portion in the axial direction be the distance L, and the high-pressure hydrogen container is configured to satisfy H<L.

EMBODIMENT

It was analyzed how hydrogen was diffused in the case where the distance L from the abutting area 18 to the stress generation portion M was varied relative to the thickness H from the abutting area 18 to the outer circumference of the cylinder body 10. Table 1 shows results of the maximum concentration [ppm] of hydrogen accumulated in the stress generation portion M.

TABLE 1

| No. | Thickness H [mm] to outer circumference | Distance L [mm] to stress generation portion M | Maximum hydrogen concentration [ppm] in stress generation portion M | Note |
|---|---|---|---|---|
| 1 | 50 | 86 | 0 | Embodiment |
| 2 | 50 | 40 | 0.33 | Comparative Example |

As indicated in Table 1, in the embodiment, the stress generation portion M is not affected by hydrogen, and it is possible to ensure an adequate strength in the state in which high-pressure hydrogen is stored. In contrast, in the comparative example, when H<L is not satisfied, hydrogen is accumulated in the stress generation portion M. Thus, in the state in which high-pressure hydrogen is stored in the storage portion 12, the fatigue strength of the high-pressure hydrogen container 100 is reduced.

The configurations described above regarding the foregoing embodiment are merely examples, and can thus be partially omitted and modified without departing from the gist of the present disclosure.

REFERENCE SIGNS LIST

10: cylinder body, 12: storage portion, 13: cylinder portion, 15: female thread portion, 15a: valley, 16: sealing surface, 17: clearance portion, 17a: bottom portion, 18: abutting area, 19: open end, 20: lid body, 21: first member, 21a: groove, 22: second member, 23: sealing portion, 24: sealing member, 25: male thread portion, 26: sealing portion, 27: end face, 100: high-pressure hydrogen container, C: center axis, $C_0$: content of hydrogen, D: hydrogen diffusion coefficient, H: thickness, J: diffusion flow rate, K: coefficient, L: distance, M: stress generation portion, P: pressure, s: solubility, t: thickness, $\kappa_p$: hydrostatic stress effectiveness factor, $\sigma$: stress, $\varphi$: normalized concentration

The invention claimed is:

1. A high-pressure hydrogen container comprising:
a cylinder body made of metal and configured to store high-pressure hydrogen; and
a lid member that closes an end portion of the cylinder body,
wherein the cylinder body includes
a joining portion that fixes the lid member to the end portion of the cylinder body in a direction along a center axis of the cylinder body,
a cylinder portion that forms an outer shell of a storage portion configured to store high-pressure hydrogen, and
a sealing surface located between the joining portion and the cylinder portion in the direction along the center axis, and formed at an inner surface of the cylinder body,
wherein the lid member includes
a sealing portion that abuts the sealing surface of the cylinder body, and
a fixation portion fixed to the joining portion of the cylinder body,
wherein an area of the sealing surface which the sealing portion abuts is an abutting area,
wherein a clearance portion is formed between the cylinder body and the lid member, the clearance portion being located between the joining portion and the abutting area, the cylinder body being separate from the lid member at the clearance portion, and
wherein at least H<L is satisfied,
where H is a thickness from the abutting area to an outer surface of the cylinder body, and
a portion of the clearance portion in which the cylinder body is furthest from the lid member, in which a stress greater than or equal to a predetermined stress $\sigma$ is generated, is a stress generation portion, and L is a distance between the abutting area and the stress generation portion being closest to the abutting area.

2. The high-pressure hydrogen container of claim 1, wherein the lid member includes a first member and a second member, the first member including the sealing portion, adjoining the cylinder portion, and having an outside diameter smaller than an inside diameter of the sealing surface, the second member including the fixation portion.

3. The high-pressure hydrogen container of claim 1, wherein the lid member includes a first member and a second member, the first member including the sealing portion, adjoining the cylinder portion, and being made of austenitic stainless steel, the second member including the fixation portion.

4. The high-pressure hydrogen container of claim 1, wherein
the joining portion is a female thread portion formed at an inner circumferential surface of an end portion of the cylinder body,
the fixation portion is a male thread portion formed at the lid member, and
the joining portion and the fixation portion are engaged with each other.

5. The high-pressure hydrogen container of claim 1, wherein the sealing portion is an O-ring attached to the lid member.

6. The high-pressure hydrogen container of claim 1, wherein the stress $\sigma$ is one-third of a tensile strength of metal material of which the cylinder body is formed, in a use state in which the cylinder portion is filled with high-pressure hydrogen.

7. The high-pressure hydrogen container of claim 1, wherein the stress $\sigma$ is a fatigue limit stress of metal material of which the cylinder body is formed, in a use state in which the cylinder portion is filled with high-pressure hydrogen.

8. The high-pressure hydrogen container of claim 1, wherein the stress $\sigma$ is a hydrostatic stress.

9. The high-pressure hydrogen container of claim 1, wherein the relationship between the thickness H and the distance L can be expressed by $H=K \cdot L$, where K is a coefficient that varies depending on at least a hydrogen concentration in the storage portion and a hydrostatic stress generated in the cylinder body, and the coefficient K is less than 1.0 (K<1.0).

10. The high-pressure hydrogen container of claim 1, wherein the cylinder body is made of low-alloy steel.

11. The high-pressure hydrogen container of claim 1, wherein the cylinder body includes two inclined surfaces at the clearance portion and the stress generation portion is positioned between the two inclined surfaces.

* * * * *